Jan. 14, 1964     O. P. STEELE III     3,118,136
LIQUID LEVEL INDICATOR

Filed Feb. 3, 1958                                    2 Sheets-Sheet 1

WITNESSES:

INVENTOR
Oliver P. Steele III
BY
ATTORNEY

United States Patent Office 3,118,136
Patented Jan. 14, 1964

3,118,136
LIQUID LEVEL INDICATOR
Oliver P. Steele III, Franklin Township, Westmoreland County, Pa., assignor to Westinghouse Electric Corporation, East Pittsburgh, Pa., a corporation of Pennsylvania
Filed Feb. 3, 1958, Ser. No. 713,013
12 Claims. (Cl. 340—244)

The present invention relates to a liquid level indicating arrangement and more particularly to one adapted for use in connection with a sealed or highly pressurized system or in relatively inaccessible locations.

In one arrangement of the invention, the liquid level indicator is arranged to actuate certain indicia when the level of the liquid falls below a predetermined level. In other arrangements of the invention, the liquid level indicator is adapted to give a continuous indication of the height of the liquid within the physical limits of the indicator.

In many applications it is necessary to ascertain the liquid level within sealed or pressurized hydraulic systems wherein the use of conventional sight glasses or other relatively fragile liquid level indicators cannot be used either because of the pressures of temperatures developed within the system or because of the corrosiveness of the liquid maintained within the system. In still other applications, liquid level indicators must be utilized in relatively inaccessible locations wherein direct or visual reading of the liquid level indicators is impossible. Moreover, in certain applications it is desirable to utilize the liquid level indicator to actuate alarm indicia or to energize controlling means for increasing or decreasing the liquid level within the system. Although liquid level controlling devices are well known, these devices are relatively complex and frequently employ fragile parts which are inappropriate for use within a pressurized system or within a sealed system employing a corrosive liquid.

In one exemplary application of the invention, the liquid level indicator disclosed herein is coupled to the rotor chamber of a "canned" motor pump unit such as that described exemplarily in the copending application of O. P. Steele III et al., entitled "Regenerative Cold Trap," filed January 30, 1957, as Serial No. 637,210, now Patent 2,964,659, and assigned to the assignee of the present application. A motor pump unit of this type is frequently adapted for pumping water, liquid metal, or other liquids at elevated temperatures and at a pressure of up to 2000 pounds per square inch and higher, and, as described in the aforementioned copending application, the liquid handled by the pump also is circulated through the rotor chamber thereof to provide lubrication for the rotor bearings.

During operation of such motor pump units, however, air frequently tends to collect at the top of the rotor chamber and may accumulate to the extent that the upper rotor bearing no longer is immersed in the liquid being handled by the pump. One form of the invention disclosed herein is utilized in an exemplary application thereof to indicate when the liquid level within the rotor chamber falls below a predetermined point and thereby to notify operating personnel when it is necessary to bleed the accumulated air out of the motor pump unit. In the absence of such liquid level indication, however, the air would have to be bled off much more frequently to assure adequate lubrication, than would be the case if the actual level could be ascertained. As a result increased maintenance of the motor-pump unit would be required.

In view of the foregoing, an object of the present invention is to provide a novel and more efficient liquid level indicator.

Another object of the invention is to provide a novel liquid level indicating system which is arranged to give an electrical signal when the liquid level falls below a predetermined height.

A further object of the invention is to provide a novel liquid level indicating arrangement adapted to give an electrical signal which is proportional to the height of the liquid level.

Still another object of the invention is to provide a liquid level indicating system having a minimum of component parts and adapted for use with systems maintained at elevated temperatures or pressures or in corrosive environments.

A still further object of the invention is the provision of a novel liquid level indicator arranged to give a remote indication of liquid level.

Yet another object of the invention is the provision of a liquid level indicator which is unaffected by ambient temperature or changes therein.

These and other objects, features and advantages of the invention will be elaborated upon during the forthcoming description of illustrative modifications of the invention with the description being taken in conjunction with the accompanying drawings, wherein.

Figure 1:
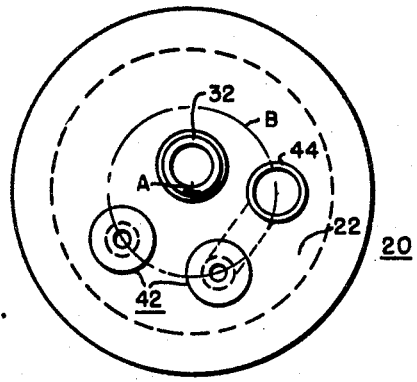
FIGURE 1 is a top plan view of one form of liquid level indicator arranged in accordance with this invention.
Figure 2:
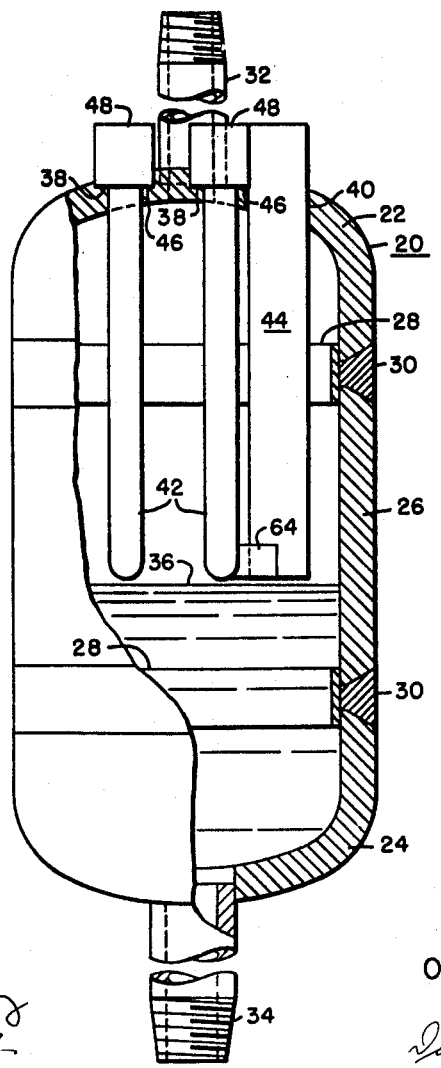
FIG. 2 is an elevational view of the liquid level indicator illustrated in FIG. 1 with part of the housing thereof being broken away for purposes of clarity.

Referring now more particularly to FIGS. 1 to 4 of the drawings, the illustrative form of the invention described therein comprises in one application a pressurized housing 20 including cup-shaped end members 22 and 24 respectively and a central cylindrical section 26. In fabricating the vessel 20, the end members 22 and 24 and the cylindrical section 26 are temporarily positioned by a pair of weld backing rings 28. Subsequently, the junction between the cylindrical section 26 and the adjacent cup members 22 and 24 are secured and sealed by structural welds 30 in a conventional manner.

The cup members 22 and 24 are provided with conduits 32 and 34 respectively which are coupled to a pressurized hydraulic system (not shown) at points above and below respectively the anticipated fluctuations of liquid level therein. When thus connected, the liquid level 36 within the vessel 20 rises and falls, of course, with the liquid level of the aforementioned system since the pressures within the vessel 20 and the system are equalized.

Inserted through eccentrically disposed apertures 38 and 40 of the upper cup member 22 are a plurality of reentrant tubes 42 and 44. In this arrangement of the invention, two of the reentrant tubes 42 and one of the tubes 44 are employed. For ease in manufacture, the eccentrically disposed tubes 42 and 44 are arranged equidistantly from the central axis A of the vessel 20 and accordingly the central axes of the reentrant tubes 42 and 44 intersect a common diameter B of the upper cup member 22. However, as pointed out previously, the arrangement of the reentrant tubes 42 and 44 within the vessel 20 is a matter of convenience and has no substantial effect upon the operation of the invention presently to be described.

The outer openings of the apertures 38 are counterbored, as denoted by the reference character 46, in order to receive the enlarged portions 48 formed at the outer ends of the reentrant tubes 42. Engagement of the enlarged portions 48 with the counterbored apertures serves to determine precisely, within the vessel 20, the relative positions of the reentrant tubes 42, and of the reentrant tube 44 which is coupled to one of the first-mentioned tubes 42 by means presently to be described. The reentrant tubes 42 and 44 are secured and sealed to the upper cup member 22 by means of annular sealing welds 49 and 51, respectively.

Figure 3:
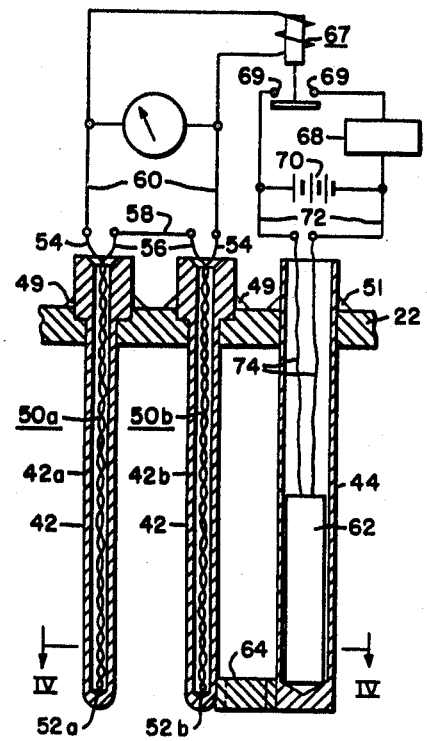
FIG. 3 is a partial cross-sectional developmental view of the liquid level indicator shown in FIG. 1 and taken about diameter B thereof.
Figure 4:
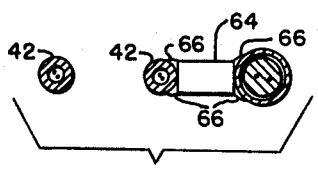
FIG. 4 is a cross-sectional view of the liquid level indicator illustrated in FIG. 3 and taken along reference lines IV—IV thereof.

As better shown in FIGS. 3 and 4 of the drawings, each of the two reentrant tubes 42 are employed as thermocouple wells and identical thermocouple elements 50a and 50b are inserted in the tubes 42a and 42b, respectively. In this arrangement of the invention, iron-Constantan thermocouples are utilized and the hot junctions 52a and 52b thereof are disposed adjacent the bottom of the thermocouple wells 42. Constantan is a well-known alloy including about 55% copper and a balance substantially of nickel. It is to be understood, however, that any pair of thermocouple elements can be utilized for the thermocouples 50a and 50b preferably, however, the thermocouples are fabricated from identical pairs of thermocouple materials.

The leads 54 and 56 of each thermocouple protrude upwardly and outwardly of the thermocouple wells 42 for connection to external circuitry. In accordance with the invention, the thermocouples 50a and 50b are coupled to electric circuitry in the manner presently to be described, and are connected such that the respective electrical currents generated thereby are in opposition. As an example, if two iron-Constantan thermocouples are utilized, the Constantan leads 56 thereof would be connected electrically by a conductor 58 while the two iron leads 54 would be connected to the aforesaid external circuitry by a pair of conductors 60.

With the thermocouples connected in this fashion, when the lower ends of the thermocouple wells 42 are at substantially the same temperature, no signal is supplied to the conductors 60. In order to furnish an indication when the liquid level falls below a predetermined height, means are furnished for conducting heat to one of the thermocouple wells, for example the tube 42b, only when the level of the liquid is below the lower end of the thermocouple well 42b. In this arrangement, then, the extent of penetration of the reentrant tubes 42 and 44 within the vessel 20 is made to coincide with the predetermined height or minimum acceptable level of the liquid. When the liquid level rises above that indicated by the reference character 36 (FIG. 2), the aforementioned heat conductive means is arranged to yield substantially all of the heat conducted thereby to the surrounding liquid with the result that the thermocouple junctions 52a and 52b are again at substantially the same temperature and no differential signal is supplied to the conductors 60.

One form of the aforementioned heat conducting means includes a source of heat in the form of an electric heating element 62 inserted within the reentrant tube 44. The heat emitted by the element 62 is, of course, transferred to the walls of the reentrant tube 44 and thence to a connecting link 64, when the liquid level within the vessel 20 is below the lower ends of the reentrant tubes 42 and 44. The connecting link 64 is secured to the thermocouple well 42b and to the heater well 44 at positions adjacent the lower ends thereof respectively. The link member 64 provides a heat conductive path between the lower end of the heater well 44 and the adjacent thermocouple well 42b and in furtherance of this purpose, the link member 64 is welded or brazed to the thermocouple well 42b and the heater well 44 as indicated by reference characters 66 (FIG. 4). The thermocouple wells 42 and the heater well 44 and the link member 64 are fabricated from relatively good heat conductive materials, and, in the event the liquid level indicator is used in a corrosive environment, stainless steel is utilized for this purpose.

In one application of the invention, the differential signal supplied to the conductor 60 by the thermocouples 50a and 50b is conducted to a sensitive relay 67. As indicated heretofore, when the liquid level within the vessel 20 has risen appreciably above that denoted by the reference character 36 so that the lower ends of the reentrant tubes 42 and 44 and the connecting link 64 are immersed in the liquid, substantially all of the heat supplied by the heating element 62 is dissipated into the surrounding liquid. As a result, the junctions 52a and 52b of the opposed thermocouples 50a and 50b are at substantially the same temperature, although the heating element 62 is continuously operated, and no signal is applied to the conductor 60. However, when the liquid level 36 falls below the ends of the reentrant tubes 42 and 44 and the connecting link 64, the temperature of the thermocouple junction 52b rises due to the heat supplied from the heating element 62 through the connecting link 64 with the result that the differential output of the opposed thermocouples 50a and 50b is sufficient to operate the relay 67. Accordingly, suitable indicating or controlling means 68 is coupled in series with a source of electrical potential 70 and the contacts 69 of relay 67. As shown in FIG. 3, the source 70 can also be utilized to energize the heating element 62 through leads 72 and 74. The indicating means 68 may be any suitable alarm indicia, for example, a light or a bell or the like which when energized by closure of the relay 67 will indicate that the liquid level 36 of the vessel 20 and of the hydraulic system (not shown) with which the liquid level indicator is utilized has fallen below a predetermined level as determined by the length of the reentrant tubes 42 and 44. It has been found that a small change in liquid level in the region of the aforesaid predetermined liquid level will increase the differential output of the thermocouples 50a and 50b sufficient to operate the relay 67.

Figure 5:
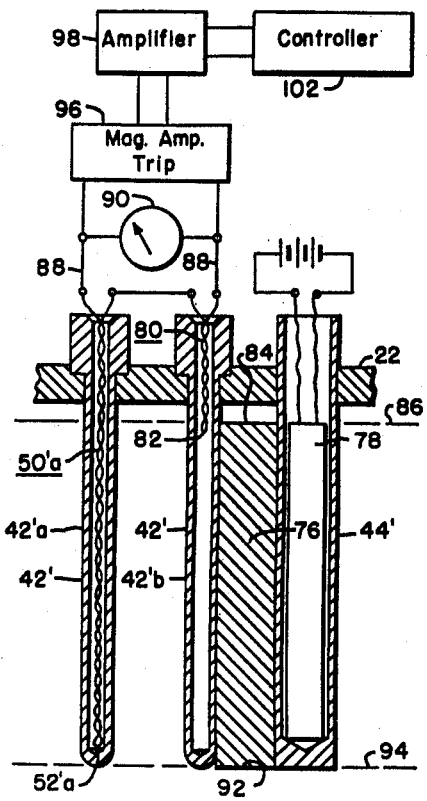
FIG. 5 is another cross-sectional developmental view taken about diameter B of FIG. 1 but showing a modified heat conductive arrangement.

Referring now to FIG. 5 of the drawings, another form of the invention is illustrated therein. The latter form of the invention is adapted in certain applications thereof for use with the pressurized vessel 20 and associated components described heretofore in connection with FIGS. 1 to 4 of the drawings. The liquid level indicator illustrated in FIG. 5, however, has been modified to yield a variable differential output which is proportional to the height of the liquid level within the physical limits of the liquid level indicator. The latter-mentioned form of the invention additionally is arranged to indicate when the liquid level has fallen below a predetermined level, which in this arrangement is adjacent the lower ends of the reentrant tubes.

The liquid level indicator as arranged in accordance with FIG. 5 therefore includes reentrant tubes 42'a, 42'b and 44'. A heat conductive path is provided between the reentrant tubes 42'b and 44' by means of an elongated link member 76. The link member 76 corresponds in length desirably to the anticipated range of liquid level fluctuations.

A heating element 78 is inserted within the reentrant tube 44' and desirably is coextensive with the elongated link member 76. A thermocouple 50'a is inserted within the tube 42'a in a manner similar to that described in connection with FIG. 3. Thus the junction 52'a of the last-mentioned thermocouple is disposed at the bottom of the reentrant tube 42'a. A foreshortened thermocouple arrangement 80, however, is inserted within the reentrant tube 42'b. In the latter case, the junction 82 of the thermocouple 80 is disposed adjacent the upper end 84 of the heat conductive link member 76.

The thermocouples 50'a and 80 are connected in opposed or bucking relation as described heretofore in connection with the thermocouples 50a and 50b of FIG. 3.

Accordingly, when the liquid level is disposed adjacent the upper end 84 of the connecting link 76 and the junction 82 of the thermocouple 80, as indicated by the dashed line 86, the junctions 52'a and 82 will be at substantially the same temperature inasmuch as practically all of the heat from the heating element 78 will be dissipated into the surrounding liquid. Consequently, the differential output of the thermocouples 50'a and 80 supplied to conductors 88 will be zero.

However, as the liquid level 86 falls, an increasing portion of the connecting link 84 will no longer be immersed in the liquid. Then, an increasing amount of heat will be conducted from the heating element 78 to the thermocouple junction 82 through the exposed portion of the link member 76 and the adjacent wall portions of the reentrant tubes 42'b and 44'. As a result, an increasing differential output signal is supplied to the conductors 88 and thence to a sensitive volt meter 90. A scale (not shown) of the volt meter 90 desirably is calibrated to read directly in convenient units the height of the liquid level 86, which height, of course, varies in inverse proportion to the signal applied to the meter 90.

As the liquid level 86 falls, the differential output of the thermocouples 42'a and 80 increases gradually until the liquid level falls at the lower end 92 of the connecting link 76 as indicated by dashed lines 84. This gradual increase, of course, is due to the increasing length of the heat conductive path between the thermocouple junction 82 and the surface of the liquid. However, when the liquid level falls below that indicated by the reference character 94, the aforementioned heat conductive path is interrupted entirely and as a result the differential signal supplied to the conductors 88 will increase rather abruptly. Thus when a reading of the meter 90 corresponds to this increase, the liquid level has fallen below a minimum acceptable level indicated by the reference character 94 and predetermined by the length of the reentrant tubes 42'a, 42'b and 44' and associated components.

In other applications of the invention, the aforementioned sudden increase in differential output can be utilized to trip a well-known feedback type magnetic amplifier denoted generally by the reference character 96 with is coupled to the output leads 88 in parallel with the meter 90. The output signal of the magnetic amplifier 96, then occurring, is applied to a conventional amplifying circuitry 98 through a pair of conductors and the signal thus amplified is employed to operate suitable controlling mechanism 102 utilized for increasing or otherwise controlling the liquid level of the associated hydraulic system.

In either of the exemplary arrangements of the invention, shown in FIGS. 3 and 5 of the drawings, the use of two identical thermocouple sensing elements or two such sensing elements having identical outputs, renders the liquid level indicator of the invention completely insensitive to ambient temperature or changes therein. This results from the fact that the oppositional connection of identical sensing elements provides a reference output signal which will be zero, at the liquid level conditions described heretofore, irrespective of the temperature of the liquid or of the air or other fluid contained within the vessel 20. In the event that considerations of ambient temperature and accuracy are less important, the thermocouples 50a or 50'a, can be omitted from the arrangement of FIG. 3 or 5 respectively and the liquid level indicator shown in either of these figures will function in the novel manner disclosed herein with the exception that the output signals will vary between maximum and minimum points dependent both upon ambient temperature and the height of liquid. By employing the oppositional sensing element as aforesaid, the output signal depends solely on liquid level and varies between a predetermined maximum value and zero, irrespective of temperature. This independence of temperature is assured by the fact that the thermocouple wells or the reentrant tubes 42 or 42' are of the same length. It will be obvious that the thermocouples shown in FIGS. 3 and 5 can be replaced by any suitable temperature sensing means whose electrical output varies with temperature. However, in the arrangement of FIG. 3, both thermocouples 50a and 50b can be omitted and the thermocouple 50b can be replaced by a thermostatic switch set to operate when the liquid level falls below the link 64 and the heat transfer from the heating element 62 to the reentrant tube 42b is increased as described previously.

From the foregoing it will be apparent that novel and efficient forms of a liquid level indicating arrangements have been disclosed herein. The descriptive and illustrative matter employed herein has been presented purely for purposes of exemplifying the invention and should not be interpreted as limitative thereof. Accordingly, numerous modifications of the invention will occur to those skilled in the art without departing from the spirit and scope of the invention. Moreover, it will be apparent that certain features of the invention can be employed without a corresponding use of other features.

Therefore, what is claimed as new is:

1. A liquid level indicator comprising a pair of vertically extending, coextensive thermocouples having the junctions thereof disposed at the same level, output means providing an output signal for said thermocouples, means for connecting said junctions in opposition and to said output means, heating means for always heat to only one of said thermocouple junctions, and heat conducting means for transferring greater heat to said one thermocouple junction when said one thermocouple junction is disposed above the level of liquid.

2. A liquid level indicator comprising a pair of vertically extending, coextensive thermocouples having the junctions thereof disposed at the same level, each of said junctions being formed respectively between identical pairs of dissimilar thermoelectric components, output means providing an output signal for said thermocouples, means connecting one pair of the similar components of said junctions respectively, and for connecting the other pair of similar components to said output means heating, means for always supplying heat to only one of said thermocouple junctions, and heat conducting means for transferring greater heat to said one thermocouple junction when said one junction is disposed above the level of liquid.

3. A liquid level indicating system comprising a pair of vertically extending coextensive thermocouples having the junctions thereof disposed at the same level, output means providing an output signal for said thermocouples, means for connecting said junctions in opposition and to said output means, a pair of heat conductive supporting members engaging said thermocouple junctions, respectively, a source of heat disposed adjacent one of said thermocouple junctions, a heat conductive supporting member surrounding said heat source, and a heat conductive link member always connected in heat conductive relation to said heat source support and to said one thermocouple support and disposed to always supply heat to said one thermocouple support when said last-mentioned support is disposed above the level of liquid.

4. A liquid level indicator comprising a supporting member, three vertically extending coextensive reentrant tubes secured to said supporting member in spaced relation, a source of heat disposed in one of said tubes, a thermocouple sensing element disposed in each of the remaining tubes, output means providing an output signal for said thermocouple elements, means for connecting said thermocouple elements in opposition and to said output means, each of said reentrant tubes being formed from a heat conductive material, and a heat conductive link member always connected in heat conductive relation to at least the lower portion of said one tube and to at least the lower portion of one of the said remaining tubes.

5. A liquid level indicator comprising a hollow supporting member, three coextensive reentrant tubes secured to said supporting member in spaced relation and each having a closed end disposed inwardly of said supporting member, a source of heat inserted in one of said tubes, a thermocouple sensing element disposed in each of the remaining tubes, output means providing an output signal for said thermocouple elements, means for connecting said thermocouple elements in opposition and to said output means, each of said reentrant tubes formed from a heat conductive material, and a heat conductive link member always connected in heat conductive relation to said one tube and to one of the said remaining tubes, said link member being disposed adjacent the closed ends of said last-mentioned tubes, and said thermocouple elements and said heat source extending to said closed ends of said reentrant tubes respectively.

6. A liquid level indicator comprising a supporting member, three coextensive reentrant tubes secured to said supporting member in spaced relation and each having a closed end disposed inwardly of said supporting member, a source of heat disposed in one of said tubes, a thermocouple sensing element disposed in each of the remaining tubes, respectively, output means providing an output signal for said thermocouple elements, means for connecting said thermocouple elements in opposition to said output means, each of said reentrant tubes formed from a heat conductive material, a heat conductive link member always connected in heat conductive relation to said one tube and to one of the said remaining tubes, the junction of one of said thermocouples being disposed adjacent the closed end of its respective tube, the junction of the other of said thermocouples being disposed within its tube at a point removed from the closed end thereof, said heat source and said heat conducting member coextending with the length of said tubes between said junctions.

7. A liquid level indicator comprising a pair of thermocouple sensing elements, output means providing an output signal for said thermocouple elements, means for connecting said thermocouple elements in opposition and to said output means, the junction of one of said thermocouple elements being at a different relative height than the other, coextensive heat conductive supports surrounding said thermocouples respectively, and a heating means disposed to supply heat to the thermocouple support enclosing the higher junction uniformly along that portion thereof corresponding to the distance along said last-mentioned support defined by said relative height.

8. A liquid level indicator adapted for use with a pressurized system, said indicator comprising a pressurized, elongated upstanding housing; a pair of thermocouple wells disposed vertically through the upper end of said housing; a heater well disposed generally vertically through said upper end; a pair of thermocouple sensing elements disposed respectively into said thermocouple wells; output means providing an output signal for said thermocouple elements, means for connecting said thermocouple elements in opposition and to said output means; a heating element disposed into said heating well; a heat conductive link member secured in heat conductive relation to said heater well and to one of said thermocouple wells, said thermocouple wells and said heater well formed from a heat conductive material; and conduit means for coupling said pressurized housing to a liquid system.

9. An indicating arrangement for determining liquid level within a vessel, said arrangement comprising at least two spaced, generally vertical reentrant tubes secured to said vessel, said tubes being coextensive and formed from a heat-conductive material, a heat conductive link always secured in heat conductive relation to said two of said tubes, a heating element disposed in one of said tubes and located therein at a position juxtaposed to said link, a temperature sensing element disposed in the other of said tubes and located therein at a position likewise juxtaposed to said link, output means providing an output signal for said sensing element, and means for connecting said sensing element to said output means.

10. An indicating arrangement for determining liquid level within a vessel, said arrangement comprising at least two spaced, coextensive reentrant tubes secured to said vessel and disposed substantially vertically, said tubes formed from a heat-conductive material, a heat conductive link always secured in heat conductive relation to said two of said tubes, a heating element disposed in one of said tubes and located therein at a position juxtaposed to said link, a thermocouple disposed in the other of said tubes and located therein at a position juxtaposed to said link, output means providing an output signal for said thermocouple, and means for connecting said thermocouple to said output means.

11. An indicating arrangement for determining liquid level within a vessel, said arrangement comprising at least two spaced, coextensive reentrant tubes secured to said vessel and disposed substantially vertically, said tubes formed from a heat-conductive material, an elongated, generally vertical heat conductive link always secured in heat conductive relation to said two of said tubes, an elongated heating element disposed in one of said tubes, said heating element coextending with said link, a temperature sensing element having a variable electrical output disposed in the other of said tubes and located therein at a position adjacent the upper end of said link, output means providing an output signal for said sensing element, and circuit means for connecting said sensing element to said output means.

12. A liquid level indicator comprising a pair of vertically extending spaced elements, temperature sensitive means disposed in each of said elements and located therein respectively at the same level, output means providing an output signal for said temperature sensitive means, means for connecting said temperature sensitive means in electrical opposition to said output means, heating means for always supplying heat to only one of said elements, and heat conducting means for transferring greater heat to said one element when said one element is disposed above the level of liquid.

References Cited in the file of this patent

UNITED STATES PATENTS

| | | |
|---|---|---|
| 1,650,986 | Herthel | Nov. 29, 1927 |
| 2,385,161 | Pinkerton | Sept. 18, 1945 |
| 2,619,566 | Mahoney | Nov. 25, 1952 |
| 2,761,924 | Keenan | Sept. 4, 1956 |

FOREIGN PATENTS

| | | |
|---|---|---|
| 772,046 | Great Britain | Apr. 10, 1957 |